(12) United States Patent
Liu et al.

(10) Patent No.: US 11,650,132 B1
(45) Date of Patent: May 16, 2023

(54) CONSTRUCTION METHOD FOR IMPACT RESPONSE PERFORMANCE LIMIT VALUE OF CRASH DUMMY AND ELECTRONIC DEVICE

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhixin Liu, Tianjin (CN); Zhixin Wu, Tianjin (CN); Hong Zheng, Tianjin (CN); Hong Chen, Tianjin (CN); Weidong Liu, Tianjin (CN); Weijie Ma, Tianjin (CN); Kai Wang, Tianjin (CN); Minghao Xie, Tianjin (CN); Ye Hao, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 18/058,735

(22) Filed: Nov. 24, 2022

(30) Foreign Application Priority Data

Dec. 9, 2021 (CN) .......................... 202111494453.0

(51) Int. Cl.
*G01M 17/007* (2006.01)
*G05B 13/04* (2006.01)

(52) U.S. Cl.
CPC ....... *G01M 17/0078* (2013.01); *G05B 13/042* (2013.01)

(58) Field of Classification Search
CPC .. G01M 17/0078; G01M 7/08; G05B 13/042; G09B 23/30; G09B 23/32; B60R 21/01558
See application file for complete search history.

(56) References Cited

U.S. PATENT DOCUMENTS 7,635,043 B2 12/2009 Breed
8,086,430 B2 12/2011 Thomas
(Continued)

*Primary Examiner* — Eric S. McCall
*Assistant Examiner* — Timothy P Graves
(74) *Attorney, Agent, or Firm* — True Shepherd LLC; Andrew C. Cheng

(57) ABSTRACT

The present invention relates to the field of passive safety testing of vehicles, in particular to a construction method for an impact response performance limit value of a crash dummy and an electronic device. The method includes: determining, according to response curves of the crash dummy under different impact test conditions, a standard response curve and alignment starting time and ending time of each response curve; aligning, according to differences between other response curves except the standard response curve and the standard response curve, other response curves except the standard response curve with the standard response curve; and determining, according to all the aligned response curves, an impact response performance limit value function of the crash dummy, where the differences include cumulative differences or cumulative variances. The method can truly, accurately and effectively construct a performance limit value of a dummy part under various impact tests.

7 Claims, 16 Drawing Sheets

(56) References Cited

U.S. PATENT DOCUMENTS 10,945,601 B2    3/2021   Greenwald et al.
2017/0249870 A1*   8/2017   Shah ..................... G09B 23/32

* cited by examiner

CONSTRUCTION METHOD FOR IMPACT RESPONSE PERFORMANCE LIMIT VALUE OF CRASH DUMMY AND ELECTRONIC DEVICE

CROSS-REFERENCE TO RELATED APPLICATIONS

This application claims priority to Chinese Patent Application No. 202111494453.0 with a filing date of Dec. 9, 2021. The content of the aforementioned application, including any intervening amendments thereto, is incorporated herein by reference.

TECHNICAL FIELD

The present invention relates to the field of passive safety testing of vehicles, in particular to a construction method for an impact response performance limit value of a crash dummy and an electronic device.

DESCRIPTION OF RELATED ART

A vehicle crash test is a technical core of evaluating vehicle safety performance, and crash dummies are key test devices directly used to evaluate vehicle safety performance instead of passengers. Impact response performance of each part of a crash dummy can directly affect a result of vehicle safety performance evaluation. An impact test for each part of the dummy is a technical approach to test performance of the dummy. Comparing impact test response output of each part of the dummy with existing performance limit value requirements is a key technical means to evaluate the performance of the dummy.

At present, performance evaluation is conducted on each part of a crash dummy under one test condition, performance limit value requirements are also based on repeated tests under one test condition, and a mean is computed to complete construction of technical requirements. However, in a real vehicle crash test scenario, each part of the dummy undergoes different crash and impact loads. Dummy part performance technical requirements obtained through an existing construction method for a performance limit value cannot truly, accurately and effectively evaluate technical performance of each part of the dummy actually applied in complex crash scenarios. At present, there are no performance limit value requirements for dummy parts under various crash and impact tests at home and abroad.

In view of this, the present invention is proposed.

SUMMARY

An objective of the present invention is to provide a construction method for an impact response performance limit value of a crash dummy and an electronic device, so as to truly, accurately and effectively construct a performance limit value of a part of a dummy under various impact tests.

In order to achieve the above objective, the present invention uses the following technical solutions:

In a first aspect, the present invention provides a construction method for an impact response performance limit value of a crash dummy. The method includes:

determining, according to response curves of the crash dummy under different impact test conditions, a standard response curve and alignment starting time and ending time of each response curve;

aligning, according to differences between other response curves except the standard response curve and the standard response curve, the other response curves except the standard response curve with the standard response curve; and determining, according to all the aligned response curves, an impact response performance limit value function of the crash dummy.

The differences include cumulative differences or cumulative variances.

In a second aspect, the present invention provides an electronic device. The electronic device includes:

at least one processor and a memory in communication connection with the at least one processor.

The memory stores an instruction executable by the at least one processor, and the instruction is executed by the at least one processor, such that the at least one processor can execute the above-mentioned method.

Compared with the prior art, the present invention has the beneficial effects:

According to the construction method for an impact response performance limit value of a crash dummy provided by the present invention, the standard response curve and the alignment starting time and ending time of each response curve are determined according to the response curves of the crash dummy under the different impact test conditions, then the response curves under the different impact test conditions are aligned in combination with the differences between the curves, and finally the impact response performance limit value function is obtained. The method may combine responses of the dummy under the different impact test conditions, so as to truly, accurately and effectively construct performance limit values of the dummy under the different impact test conditions, and provide more reliable data support for impact performance test verification of the dummy; especially for different parts of the dummy, a performance limit value corresponding to each part may be obtained; and even if there are differences between impact response curves of different parts of the dummy in phase, amplitude and type, accuracy of the limit value of each part is not affected, such that a reliable basis is provided for subsequent part test verification.

BRIEF DESCRIPTION OF THE DRAWINGS

In order to describe technical solutions in specific embodiments of the present invention or in the prior art more clearly, the accompanying drawings required in the description of the specific embodiments or the prior art will be briefly introduced below. Apparently, the accompanying drawings in the following description show only some embodiments of the present invention, and those of ordinary skill in the art can still derive other drawings from these drawings without any creative effort.

DESCRIPTION OF THE EMBODIMENTS

Exemplary embodiments of the present application are described below with reference to the accompanying drawings, which include various details of the embodiments of the present application to facilitate understanding, and should be considered as illustrative only. Therefore, those of ordinary skill in the art should recognize that various changes and modifications can be conducted on the embodiments described herein without departing from the scope and spirit of the present application. Likewise, for clarity and conciseness, the descriptions of well-known functions and structures are omitted below.

Embodiment 1

Figure 1:
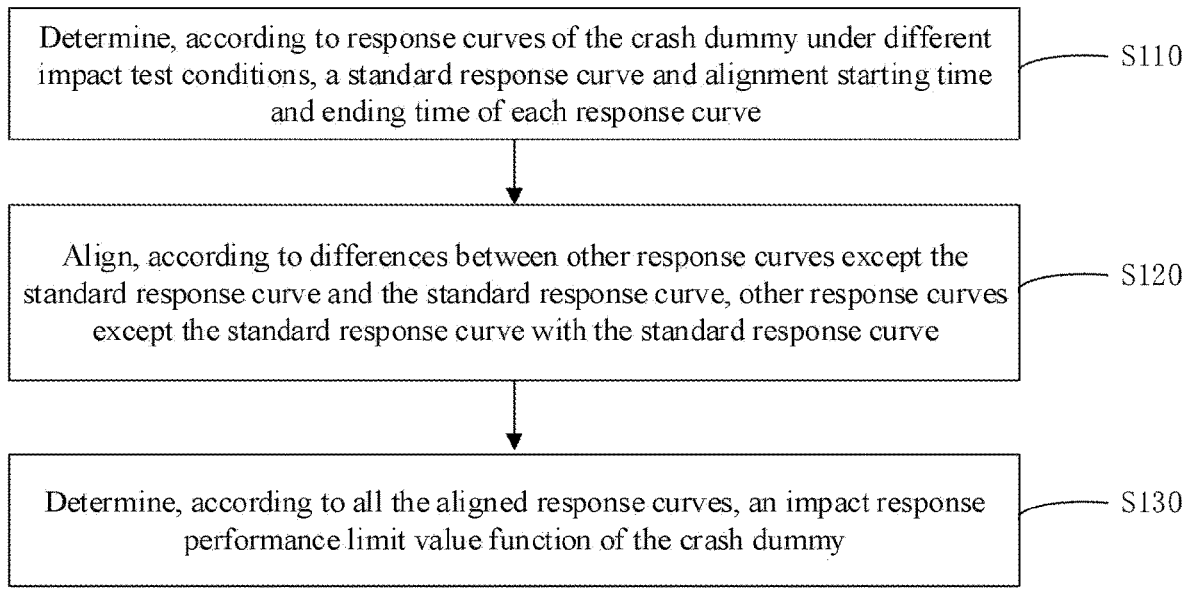
FIG. 1 is a flowchart of a construction method for an impact response performance limit value of a crash dummy provided in Embodiment 1.

FIG. 1 is a flowchart of a construction method for an impact response performance limit value of a crash dummy provided by the embodiment. The method may be executed by a construction apparatus for an impact response performance limit value of a crash dummy. The apparatus may be composed of software and/or hardware, and is generally integrated in an electronic device.

With reference to FIG. 1, the construction method includes the following steps.

S110: according to response curves of the crash dummy under different impact test conditions, a standard response curve and alignment starting time and ending time of each response curve are determined.

The different impact test conditions refer to all conditions related to a performance test of each part of the dummy, and include, but are not limited to, a mass of an impact pendulum, an impact velocity of the pendulum, a shape of a contact surface between the pendulum and a dummy part, etc. The test conditions are equivalent reappearance conditions of an actual crash in a laboratory environment. The response curves refer to output curves of all crash responses of a dummy crash, and include, but are not limited to, an acceleration curve, a force curve, a moment curve, a displacement curve, an angular velocity curve, etc. The standard response curve refers to a response curve as an alignment reference. The alignment starting time and ending time refer to time references for limiting response curve segments participating in alignment.

Preferably, the step that according to response curves of the crash dummy under different impact test conditions, a standard response curve and alignment starting time and ending time of each response curve are determined includes the steps that the standard response curve is determined according to the response curves of the crash dummy under different impact test conditions and probabilities of occurrences of different impact test conditions; and the alignment starting time and ending time of each response curve are determined according to the response curves of the crash dummy under different impact test conditions, a first response ratio function, a second response ratio function, an alignment starting time response ratio and an alignment ending time response ratio.

The first response ratio function is configured to indicate a relation between a maximum peak response value on the response curve and a response value on the left of the maximum peak response value; and the second response ratio function is configured to indicate a relation between a last peak response value on the response curve and a response value on the right of the last peak response value.

In the preferred embodiment, a response curve formed under an impact test condition corresponding to a crash impact having maximum occurrence frequency in the actual crash is selected as the standard response curve.

Figure 2:
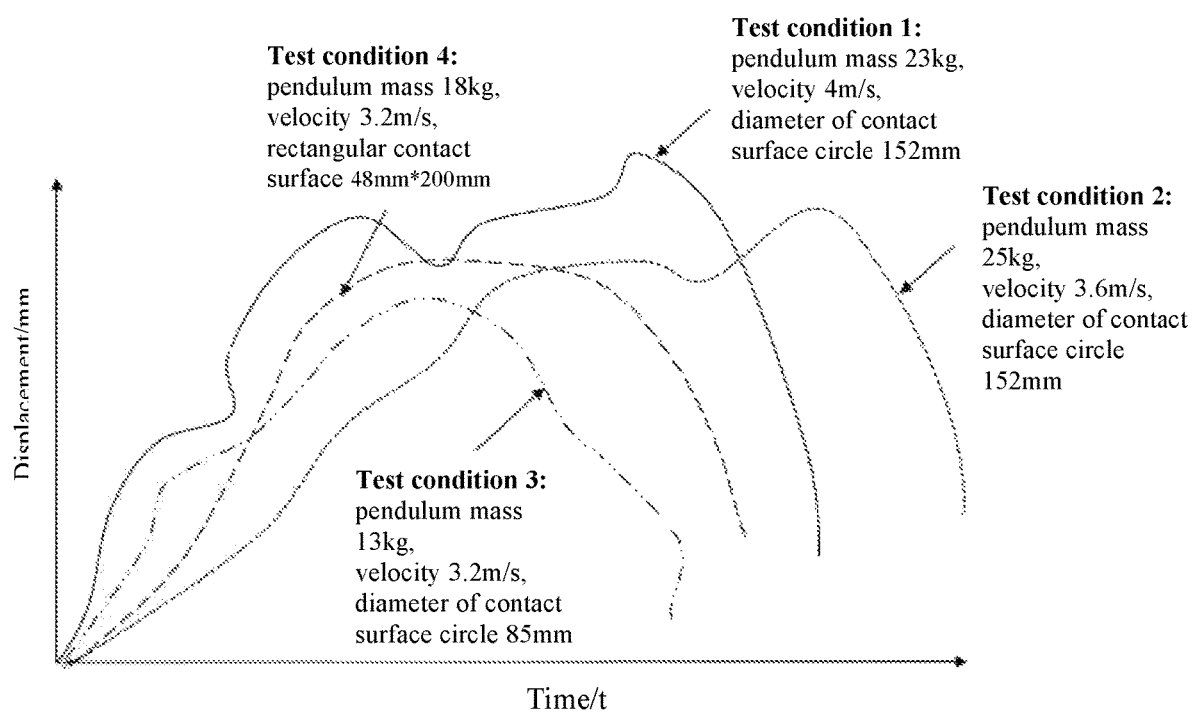
FIG. 2 is a schematic diagram of response curves of displacement of a dummy chest under different test load conditions.

For example, with a Hybrid III50th dummy chest impact test as an example, a dummy chest is placed under four different pendulum impact load conditions that involve three types of variables: a mass of an impact pendulum, an impact velocity, and a shape of a contact area between the pendulum and the dummy chest. Actual test set parameters and obtained displacement response curves are shown in FIG. 2. Four response curves of displacement of the dummy chest are output and obtained, and a response curve corresponding to Test condition 1 is selected as a standard response curve $f_Q(t)$.

Preferably, the first response ratio function is $$D_s = \frac{f(t)_{maxpeak} - f(t_i)}{f(t)_{maxpeak}}, \qquad \text{(Formula 1)}$$

where $f(t)_{maxpeak}$ is a maximum peak response value on the response curve, and $f(t_i)$ is an i-th response value on the left of the maximum peak response value.

The alignment starting time response ratio is 0.7-0.95 (including but not limited to 0.7, 0.75, 0.8, 0.85, 0.9, 0.95, etc.).

The second response ratio function is $$D_d = \frac{f(t)_{lastpeak} - f(t_j)}{f(t)_{lastpeak}}, \qquad \text{(Formula 2)}$$

where $f(t)_{lastpeak}$ is a last peak response value on the response curve, and $f(t_j)$ is a j-th response value on the right of the last peak response value.

The alignment ending time response ratio is 0.6-0.92 (including but not limited to 0.6, 0.7, 0.8, 0.9, 0.92, etc.).

Figure 3:
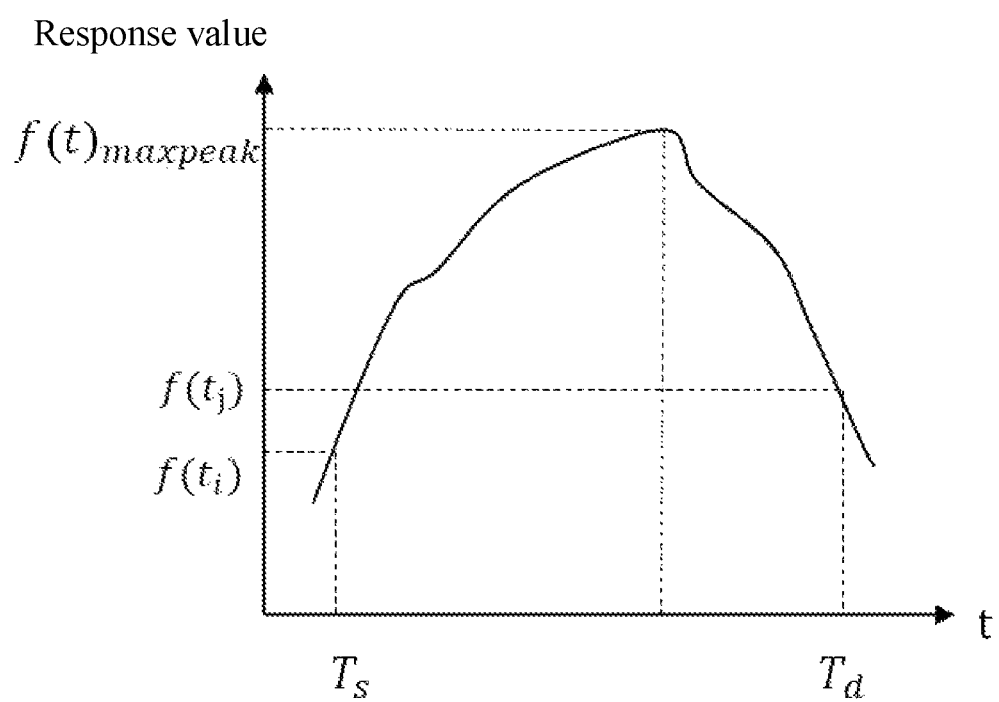
FIG. 3 is a schematic diagram for determining alignment starting time and ending time.

FIG. 3 shows a schematic diagram for determining alignment starting time and ending time.

For example, for the standard response curve, the alignment starting time response ratio of the response curve of the displacement of the dummy chest is defined as 0.9, corresponding $f(t_i)$ when the response ratio of the displacement of the dummy chest is 0.9 may be computed according to Formula 1, and then the alignment starting time $T_s$ obtained is 9 ms. The alignment ending time response ratio of the response curve of the displacement of the dummy chest is defined as 0.8, corresponding $f(t_j)$ when the response ratio of the displacement of the dummy chest is 0.8 may be computed according to Formula 2, and then the alignment ending time $T_d$ obtained is 83 ms.

S120: according to differences between other response curves except the standard response curve and the standard response curve, other response curves except the standard response curve are aligned with the standard response curve.

The differences include cumulative differences or cumulative variances.

The aligning refers to translating other response curves except the standard response curve along a time axis, such that other response curves may coincide with the standard response curve to the greatest extent within intervals between their respective alignment starting time and ending time.

Optionally, the step that according to differences between other response curves except the standard response curve and the standard response curve, other response curves except the standard response curve are aligned with the standard response curve includes the steps that a cumulative difference of response amplitudes between each of other response curves and the standard response curve is computed; and each of other response curves is translated along the time axis, and for each of other response curves, a curve position having a minimum cumulative difference is selected as an alignment position of other response curves.

Preferably, the step that according to differences between other response curves except the standard response curve and the standard response curve, other response curves except the standard response curve are aligned with the standard response curve includes the steps that:

a cumulative variance of response amplitudes between each of other response curves and the standard response curve is computed; and each of other response curves is translated along the time axis, and for each of other response curves, a curve position having a minimum cumulative variance is selected as an alignment position of other response curves.

Figure 4:
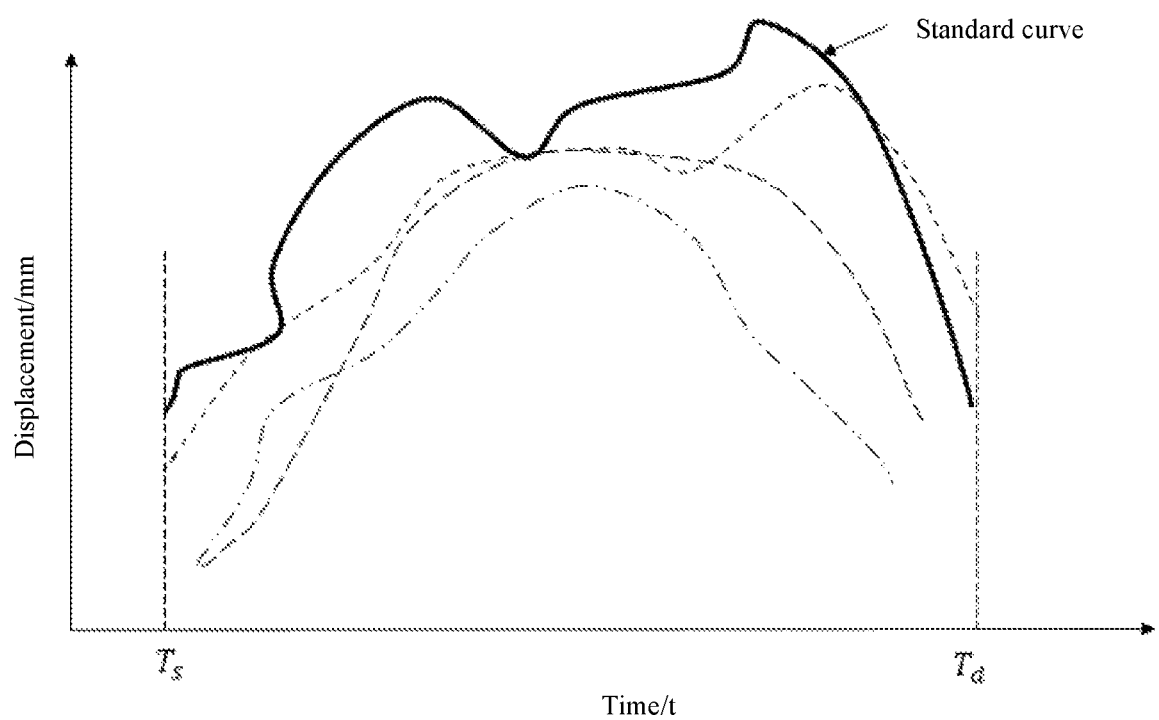
FIG. 4 is a schematic diagram of different response curves of displacement of a dummy chest after alignment.

For example, a part of the response curve between the alignment starting time $T_s$ and the alignment ending time $T_d$ is defined as an effective response curve. Within the time and response amplitude range, a response amplitude cumulative variance $E_{QI}$ of other response curves $f_i(t)$ and $f_Q(t)$ is computed. The curve $f_i(t)$ is translated along the time axis, and under the condition of a minimum cumulative variance (which is computed according to Formula 3), the curve $f_i(t)$ is aligned with the curve $f_Q(t)$, as shown in FIG. 4 (it should be understood that $T_s$ and $T_d$ in FIG. 4 are the alignment starting time and the alignment ending time of the standard response curve).

$$E_{QI} = \min \sum\nolimits_{T_s}^{T_d} (f_Q(t) - f_i(t))^2 \quad \text{(Formula 3)}$$

S130: according to all the aligned response curves, an impact response performance limit value function of the crash dummy is determined.

All the response curves refer to a part of the standard response curve within the interval between the alignment starting time and ending time and aligned parts of other response curves within the interval between the alignment starting time and ending time.

Optionally, the step that according to all the aligned response curves, an impact response performance limit value function of the crash dummy is determined includes the steps:

a variance response function is determined according to all the aligned response curves; and the impact response performance limit value function of the crash dummy is determined according to the variance response function.

For example, variances of all the response curves are computed to obtain the variance response function, and then, on the basis of the variance response function, a standard deviation is added to obtain a high performance limit value function for an impact response of the crash dummy and a standard deviation is reduced to obtain a low performance limit value function for an impact response of the crash dummy.

According to the construction method for an impact response performance limit value of a crash dummy, the standard response curve and the alignment starting time and ending time of each response curve are determined according to the response curves of the crash dummy under different impact test conditions, then the response curves under different impact test conditions are aligned in combination with the differences between the curves, and finally the impact response performance limit value function is obtained. The method may combine responses of the dummy under different impact test conditions, so as to truly, accurately and effectively construct performance limit values of the dummy under different impact test conditions, and provide more reliable data support for impact performance test verification of the dummy; especially for different parts of the dummy, a performance limit value corresponding to each part may be obtained; and even if there are differences between impact response curves of different parts of the dummy in phase, amplitude and type, accuracy of the limit value of each part is not affected, such that a reliable basis is provided for subsequent part test verification.

Embodiment 2

Figure 5:
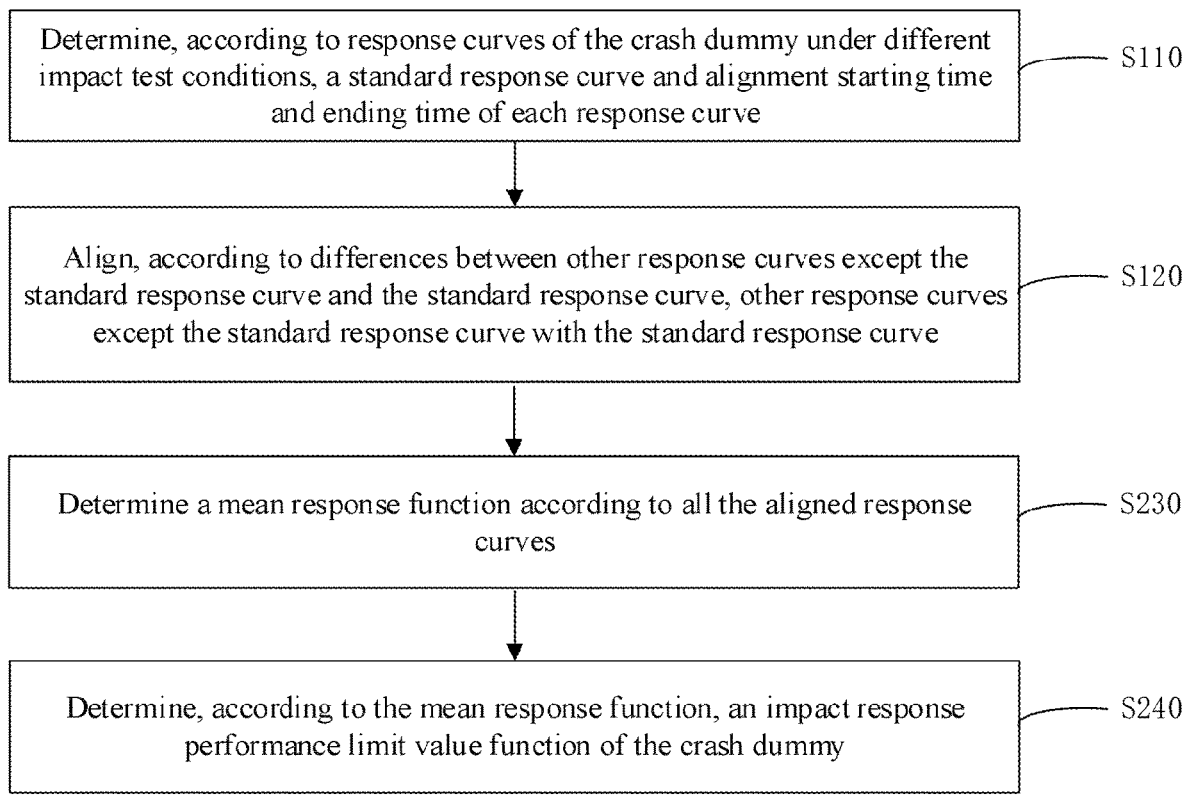
FIG. 5 is a flowchart of a construction method for an impact response performance limit value of a crash dummy provided in Embodiment 2.

As shown in FIG. 5, the embodiment provides another construction method for an impact response performance limit value of a crash dummy. The embodiment further optimizes S130 in Embodiment 1, and the construction method includes the following steps:

S110: according to response curves of the crash dummy under different impact test conditions, a standard response curve and alignment starting time and ending time of each response curve are determined.

S120: according to differences between other response curves except the standard response curve and the standard response curve, other response curves except the standard response curve are aligned with the standard response curve.

S110 and S120 above are the same as those in Embodiment 1, and will not be repeated herein.

S230: a mean response function is determined according to all the aligned response curves.

The mean response function refers to a function formed between means of all the response curves at different time and the time.

Optionally, the mean response function is $$\overline{f(t)} = \sum_{j=1}^{k} \frac{f_j(t)}{k},$$ (Formula 4)

where $f_j(t)$ is a response curve within an interval of the alignment starting time and ending time, and k is the total number of all the response curves.

S240: according to the mean response function, an impact response performance limit value function of the crash dummy is determined.

For example, standard deviations of all the response curves are computed, and then, on the basis of the mean response function, a standard deviation is added to obtain a high performance limit value function for an impact response of the crash dummy and a standard deviation is reduced to obtain a low performance limit value function for an impact response of the crash dummy.

The impact response performance limit value function of the crash dummy is obtained on the basis of the mean response function in the embodiment.

Embodiment 3

Figure 6:
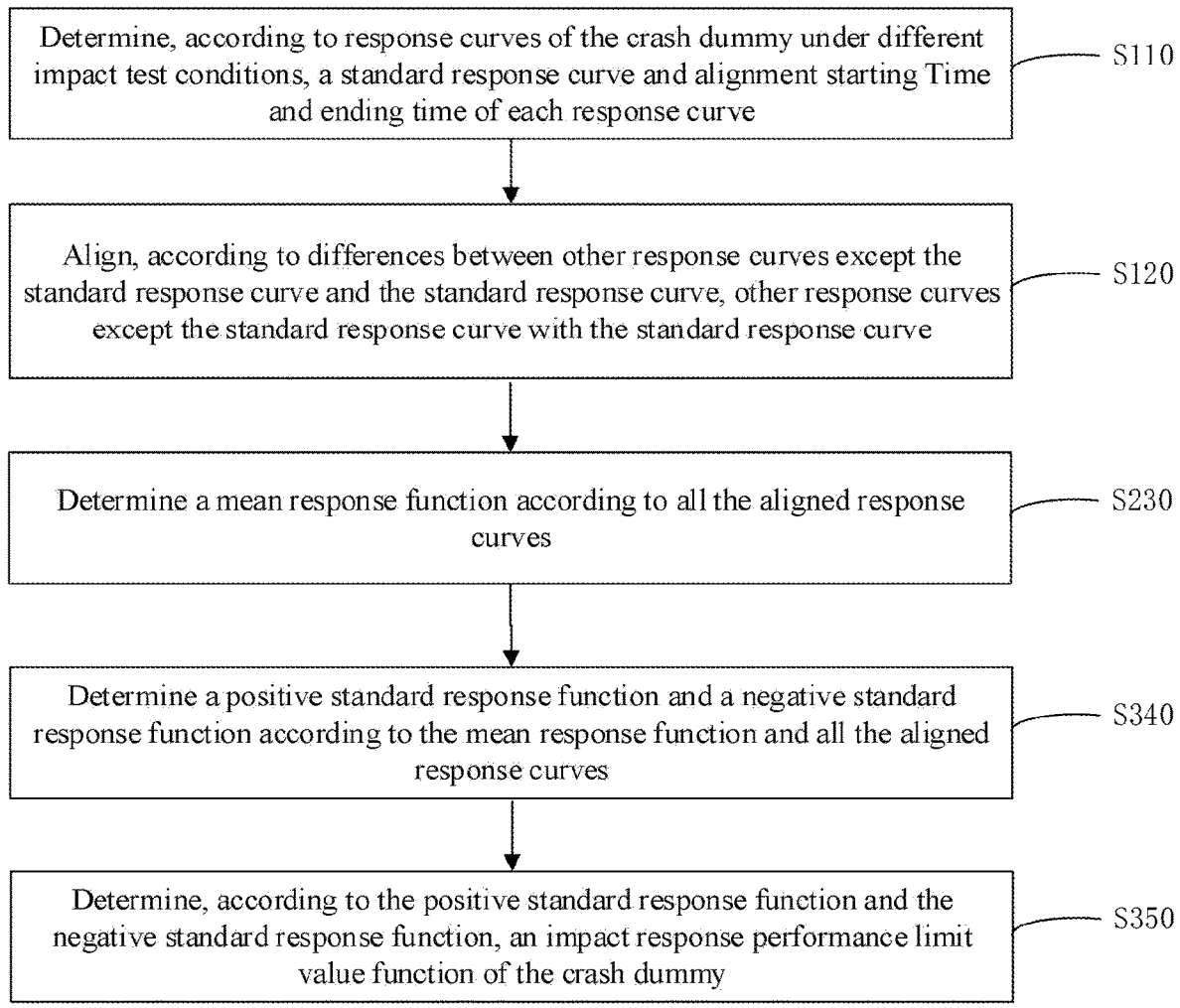
FIG. 6 is a flowchart of a construction method for an impact response performance limit value of a crash dummy provided in Embodiment 3.

As shown in FIG. 6, the embodiment provides another construction method for an impact response performance limit value of a crash dummy. The embodiment further optimizes S130 in Embodiment 1, and the construction method includes the following steps:

S110: according to response curves of the crash dummy under different impact test conditions, a standard response curve and alignment starting time and ending time of each response curve are determined.

S120: according to differences between other response curves except the standard response curve and the standard response curve, other response curves except the standard response curve are aligned with the standard response curve.

S230: a mean response function is determined according to all the aligned response curves.

S110, S120, and S230 above are the same as those in Embodiment 2, and will not be repeated herein.

S340: a positive standard response function and a negative standard response function are determined according to the mean response function and all the aligned response curves.

The positive standard response function is $$F_U(t) = \sqrt{\sum_{j=1}^{k} \frac{f_j(t)^2}{k^2} + \frac{(f_j(t) - \overline{f(t)})^2}{k-1}}.$$ (Formula 5)

The negative standard response function is $$F_L(t) = \sqrt{\sum_{j=1}^{k} \frac{f_j(t)^2}{k^2} - \frac{(f_j(t) - \overline{f(t)})^2}{k-1}}.$$ (Formula 6)

Figure 7:
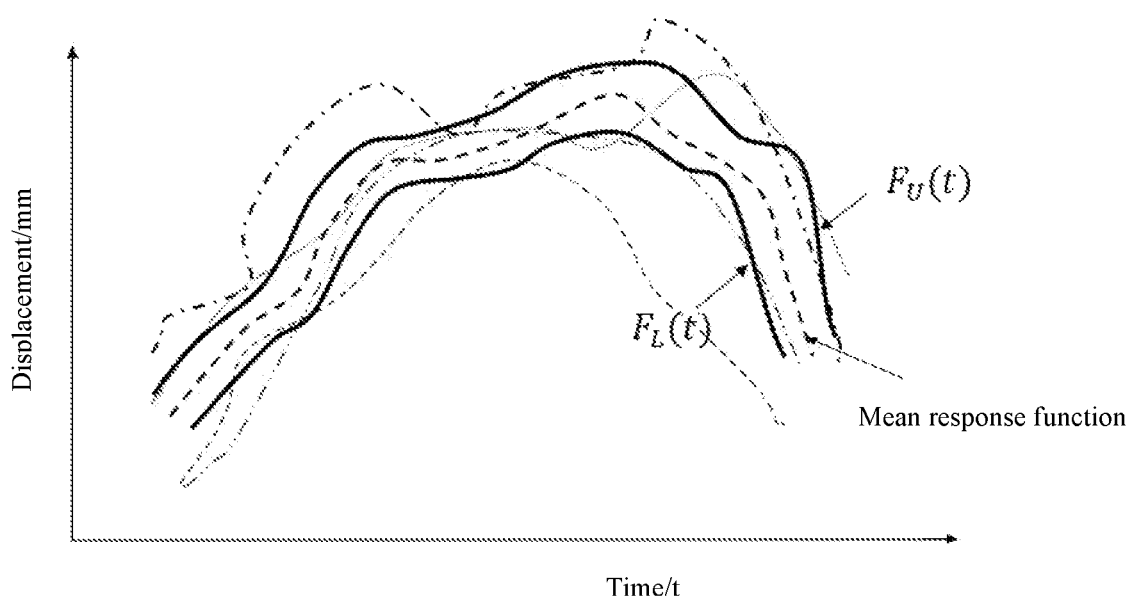
FIG. 7 is a schematic diagram of a mean response function and positive and negative standard response functions of displacement of a dummy chest.

FIG. 7 is a schematic diagram of a mean response function and positive and negative standard response functions of displacement of a dummy chest.

S350: according to the positive standard response function and the negative standard response function, an impact response performance limit value function of the crash dummy is determined.

Optionally, the step that according to the positive standard response function and the negative standard response function, an impact response performance limit value function of the crash dummy is determined includes the step that the impact response performance limit value function of the crash dummy is constructed according to the positive standard response function, the negative standard response function, the alignment starting time and ending time, and peak time.

In the embodiment, a high performance preselected limit value function and a low performance preselected limit value function are constructed according to actual forms of the positive standard response function and the negative standard response function, a corresponding limit value function is constructed between any two of alignment starting time, first peak time, N middle peak time, last peak time and alignment ending time, and finally, the limit value functions of all the intervals are integrated to obtain the impact response performance limit value function of the crash dummy.

Preferably, the step that according to the positive standard response function and the negative standard response function, an impact response performance limit value function of the crash dummy is determined includes the following steps that the number of limit value functions is determined according to the positive standard response function, the negative standard response function, a first interval between alignment starting time and first peak time on the positive standard response function, a second interval between occurrences of adjacent peaks on the positive standard response function, a third interval between last peak time on the positive standard response function and alignment ending time on the positive standard response function, a fourth interval between alignment starting time and first peak time on the negative standard response function, a fifth interval between occurrences of adjacent peaks on the negative standard response function, and a sixth interval between last peak time on the negative standard response function and alignment ending time on the negative standard response function;

according to the number of limit value functions, a plurality of high performance preselected limit value functions and a plurality of low performance preselected limit value functions are constructed; and the impact response performance limit value function of the crash dummy is determined according to the high performance preselected limit value functions, the low performance preselected limit value functions, the positive standard response function and the negative standard response function.

It should be noted that, the "alignment starting time on the positive standard response function" and the "alignment starting time on the negative standard response function" are different from the above-mentioned "alignment starting time". This is because the positive standard response function and the negative standard response function are obtained according to the mean response function and all the aligned response curves, and the starting time of the function is different from the initial alignment starting time. Similarly, the "alignment ending time on the positive standard response function" and the "alignment ending time on the negative standard response function" are also different from the above-mentioned "alignment ending time".

Figure 8:
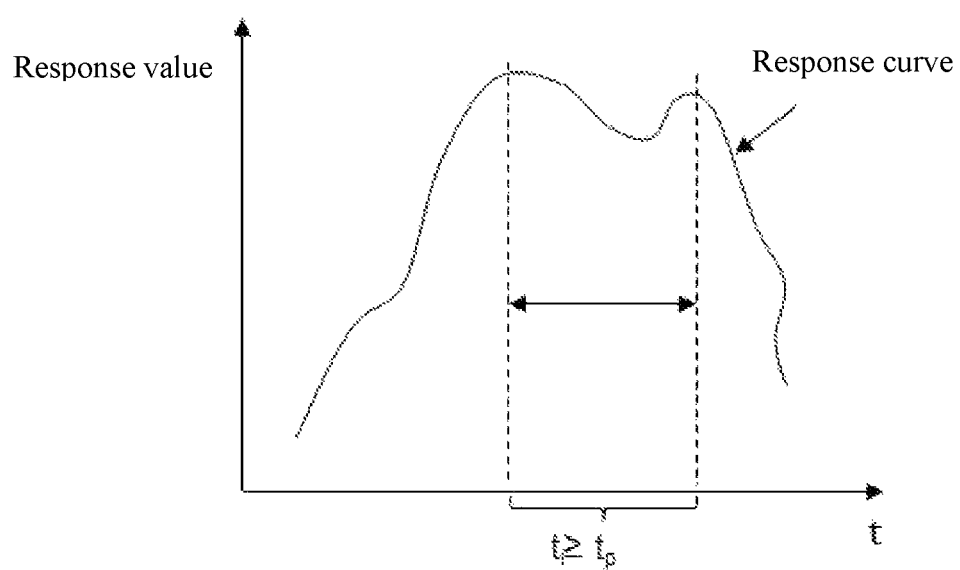
FIG. 8 is a schematic diagram showing that an interval between two peaks of a response curve is greater than or equal to $t_p$.
Figure 9:
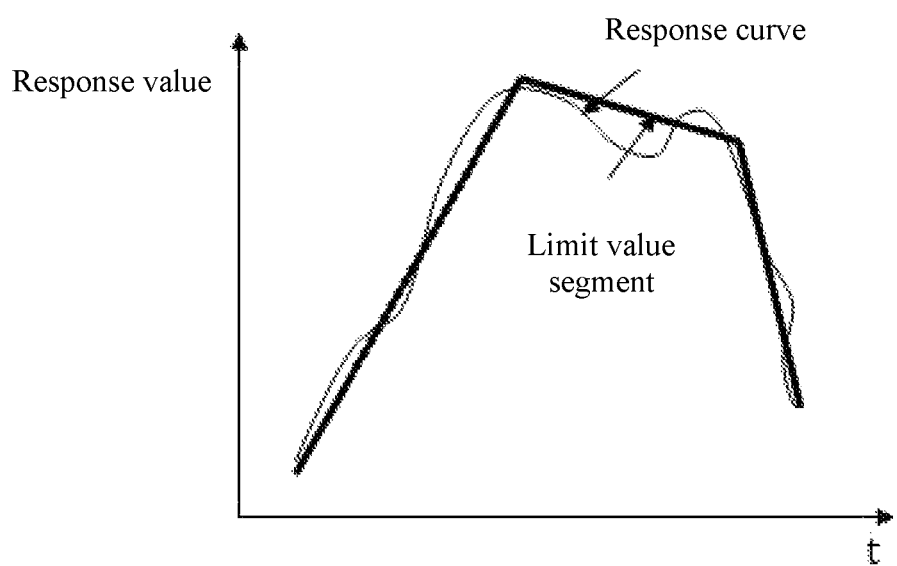
FIG. 9 is a schematic diagram of performance limit value delineation when an interval between two peaks of a response curve is greater than or equal to $t_p$.
Figure 10:
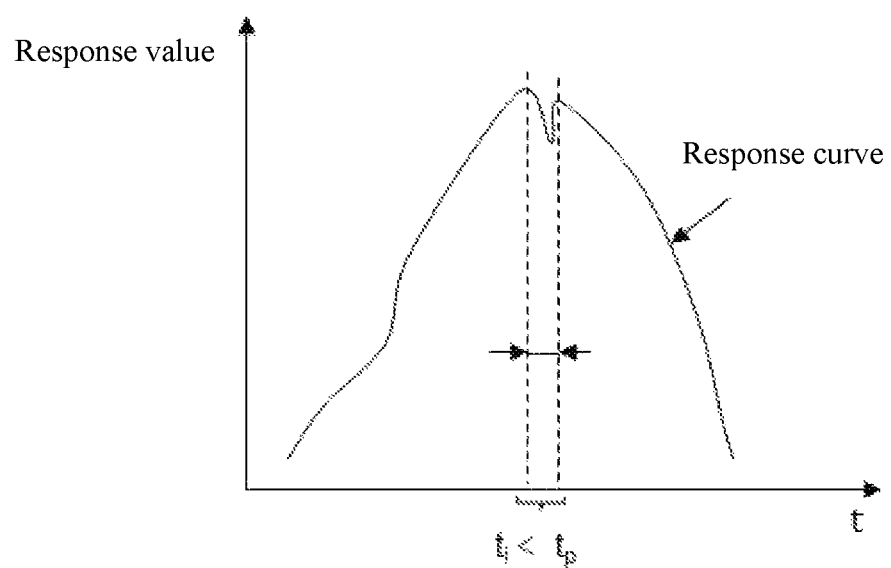
FIG. 10 is a schematic diagram showing that an interval between two peaks of a response curve is smaller than $t_p$.
Figure 11:
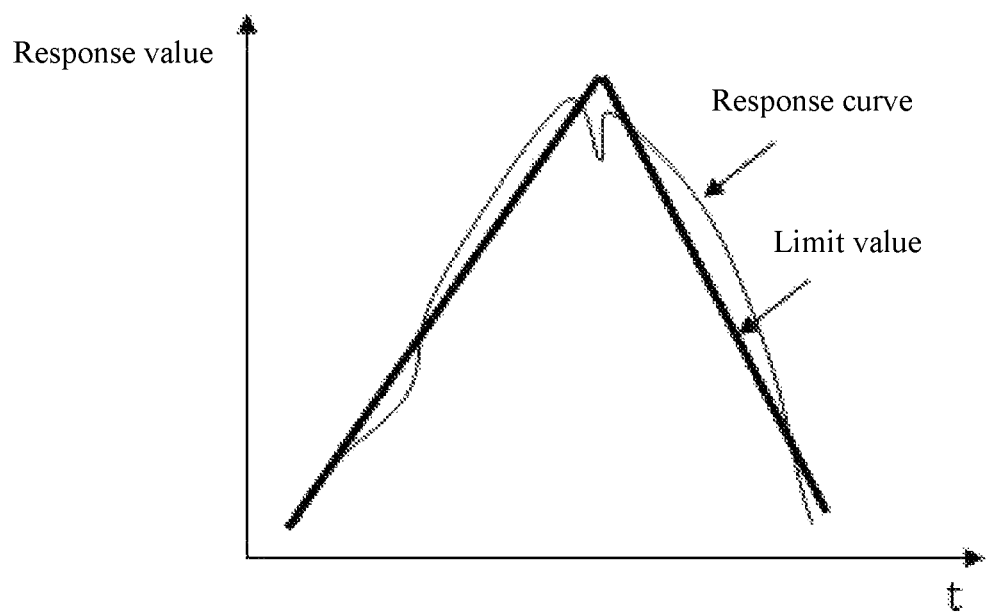
FIG. 11 is a schematic diagram of performance limit value delineation when the interval between two peaks of a response curve is smaller than $t_p$.

Preferably, the step that the number of limit value functions is determined according to the positive standard response function, the negative standard response function, a first interval between alignment starting time and first peak time on the positive standard response function, a second interval of occurrences between adjacent peaks on the positive standard response function, a third interval between last peak time on the positive standard response function and alignment ending time on the positive standard response function, a fourth interval between alignment starting time and first peak time on the negative standard response function, a fifth interval between occurrences of adjacent peaks on the negative standard response function, and a sixth interval between last peak time on the negative standard response function and alignment ending time on the negative standard response function includes the following steps that for the positive standard response function, a first interval to be compared is compared with a preset interval, and if the first interval to be compared is greater than or equal to the preset interval, it is determined that there is a limit value function in the first interval to be compared (as shown in FIG. 8 and FIG. 9, $t_p$ is the preset interval and $t_i$ is the first interval to be compared); and alternatively, if the first interval to be compared is smaller than the preset interval, it is determined that there is a limit value function in the next interval adjacent to the first interval to be compared (as shown in FIG. 10 and FIG. 11), where the first interval to be compared is the first interval, the second interval or the third interval, and the next adjacent interval is greater than or equal to the preset interval; and for the negative standard response function, a second interval to be compared is compared with a preset interval, and if the second interval to be compared is greater than or equal to the preset interval, it is determined that there is a limit value function in the second interval to be compared; and alternatively, if the second interval to be compared is smaller than the preset interval, it is determined that there is a limit value function in the next interval adjacent to the second interval to be compared, where the second interval to be compared is the fourth interval, the fifth interval or the sixth interval, and the next adjacent interval is greater than or equal to the preset interval.

Optionally, the high performance preselected limit value function and the low performance preselected limit value function may be constructed according to the following expression:

$$C(t)=g_n x(t)^n + g_{n-1} x(t)^{n-1} + \ldots + g_1 x(t) + g_0 \quad \text{(Formula 7)}.$$

Figure 12:
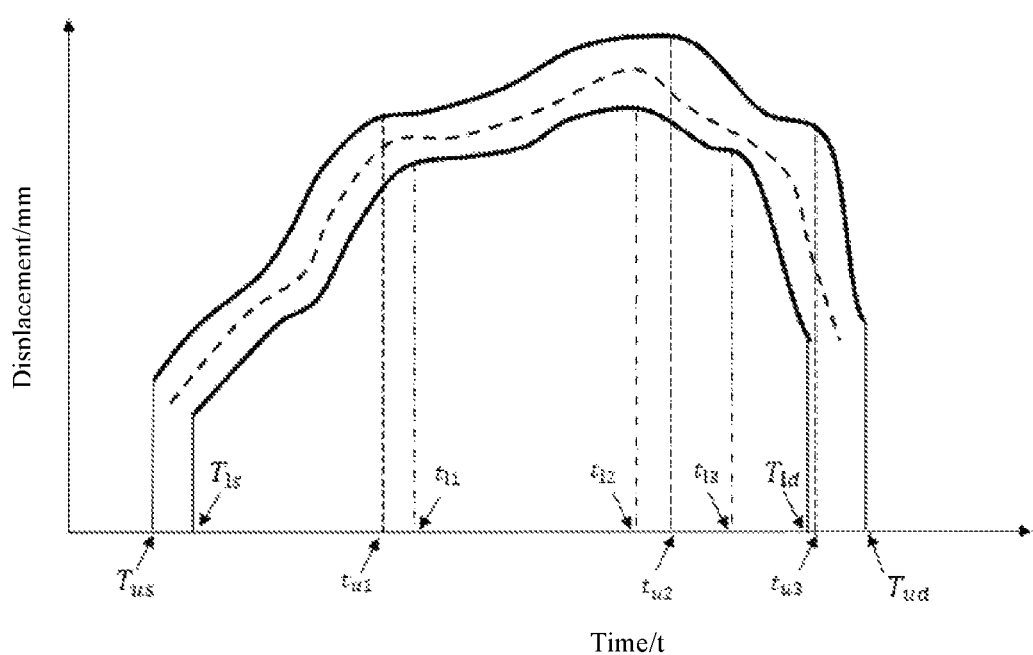
FIG. 12 is a schematic diagram of a mean response function and positive and negative standard response functions of displacement of a dummy chest.

For example, the preset interval is set to 5 ms. As shown in FIG. 12, for the time corresponding to the positive standard response function $F_U(t)$ of displacement of a chest: on the positive standard response function, the alignment starting time $T_{us}=9$ ms, the first peak time $t_{u1}=24$ ms, the second peak time $t_{u2}=55$ ms, the third peak time $t_{u3}=78$ ms, and the alignment ending time $T_{ud}=83$ ms; the intervals are $t_{u1}-T_{us}=15$ ms, $t_{u2}-t_{u1}=31$ ms, $t_{u3}-t_{u2}=23$ ms, and $T_{ud}-t_{u3}=5$ ms, respectively; and it is determined that the high performance limit value function of a displacement response of a chest is composed of four line segments according to a 5-ms principle. For the time corresponding to the negative standard response function $F_L(t)$ of the displacement of the chest: on the negative standard response function, the alignment starting time $T_{1s}=11$ ms, the first peak time $t_{11}=29$ ms, the second peak time $t_{12}=43$ ms, the third peak time $t_{13}=64$ ms, and the alignment ending time $T_{1d}=74$ ms; the intervals are $t_{11}-T_{1s}=18$ ms, $t_{12}-t_{11}=14$ ms, $t_{13}-t_{12}=21$ ms, and $T_{1d}-t_{13}=10$ ms, respectively; and it is determined that the low performance limit value function of a displacement response of the chest is composed of four line segments according to a 5-ms principle.

For example, the expression of constructing the high performance preselected limit value function and the low performance preselected limit value function is as follows: $C(t)=k_i(t)+d_i$ (Formula 8), where $k_i(t)$ is a slope, $d_i$ is an intercept, and i is a serial number of the preselected limit value function.

Preferably, the step that the impact response performance limit value function of the crash dummy is determined according to the high performance preselected limit value functions, the low performance preselected limit value functions, the positive standard response function and the negative standard response function includes the steps that:

according to the high performance preselected limit value functions and the positive standard response function, first-type intersection points between the high performance preselected limit value functions and the positive standard response function are determined; according to the first-type intersection points, a first area that is enclosed by the high performance preselected limit value functions and the positive standard response function between two adjacent first-type intersection points and is located above the high performance preselected limit value functions is determined; and a high performance limit value function is determined according to the first area; and according to the low performance preselected limit value functions and the negative standard response function, second-type intersection points between the low performance preselected limit value functions and the negative standard response function are determined; according to the second-type intersection points, a second area that is enclosed by the low performance preselected limit value functions and the negative standard response function between two adjacent second-type intersection points and is located below the low performance preselected limit value functions are determined; and a low performance limit value function is determined according to the second area.

For example, a high performance limit value index and a low performance limit value index may be preset. The high performance limit value index is configured to indicate a relation between the first area and a projected area of the positive standard response function on the time axis, and the low performance limit value index is configured to indicate a relation between the second area and a projected area of the negative standard response function on the time axis.

Figure 13:
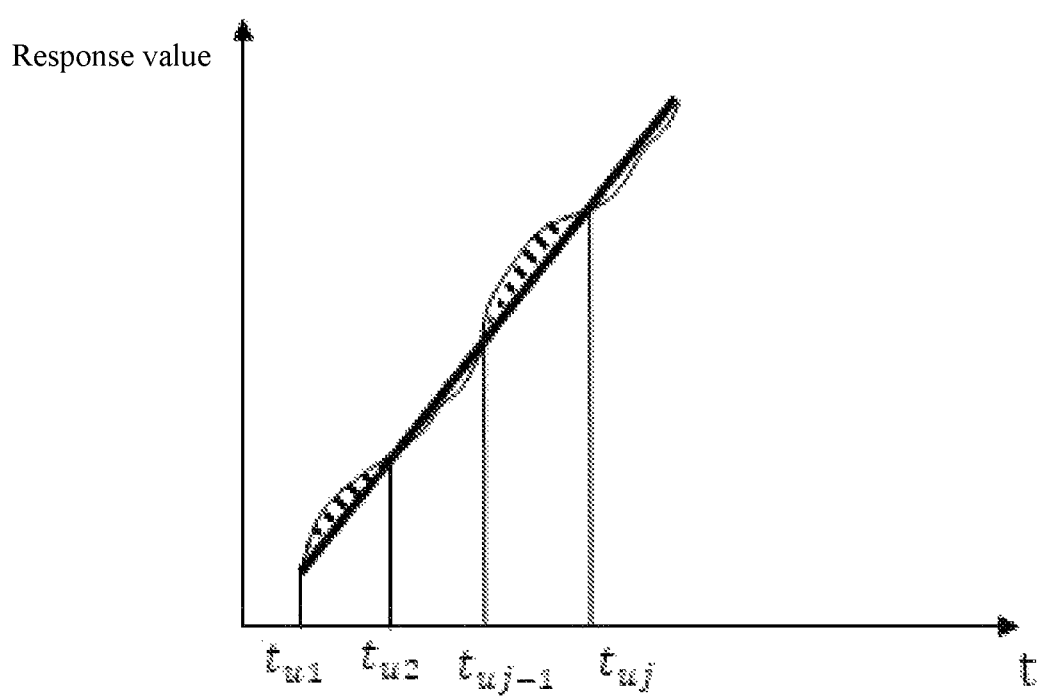
FIG. 13 is a schematic diagram for determining a high performance limit value function according to a high performance limit value index.

Optionally, the high performance limit value index is $$W_u = \sum \frac{\int_{t_{ua}}^{t_{ub}} F_U(t)dt - \int_{t_{ua}}^{t_{ub}} (k_i(t)+d_i)dt}{\int_{t_{ua}}^{t_{ub}} F_U(t)dt}, \quad \text{(Formula 9)}$$

where $t_{ua}$ is starting time when a response value of a certain curve segment on the positive standard response function is greater than a response value corresponding to the high performance preselected limit value function, and $t_{ub}$ is ending time when a response value of a certain curve segment on the positive standard response function is greater than a response value corresponding to the high performance preselected limit value function. When $W_u$ is within a preset range (e.g., 0.08-0.36, typically 0.1), the high performance preselected limit value function is the desired high performance limit value function. FIG. 13 is a schematic diagram for determining a high performance limit value function according to a high performance limit value index.

Optionally, the low performance limit value index is $$W_l = \sum \frac{\int_{t_{la}}^{t_{lb}} (C(t))dt - \int_{t_{la}}^{t_{lb}} F_L(t)dt}{\int_{t_{la}}^{t_{lb}} F_L(t)dt}, \quad \text{(Formula 10)}$$

where $t_{1a}$ is starting time when a response value of a certain curve segment on the negative standard response function is smaller than a response value corresponding to the low performance preselected limit value function, and $t_{1b}$ is ending time when a response value of a certain curve segment on the negative standard response function is smaller than a response value corresponding to the low performance preselected limit value function. When Wi is within a preset range (e.g., 0.1-0.3, typically 0.2), the low performance preselected limit value function is the desired low performance limit value function.

Figure 14:
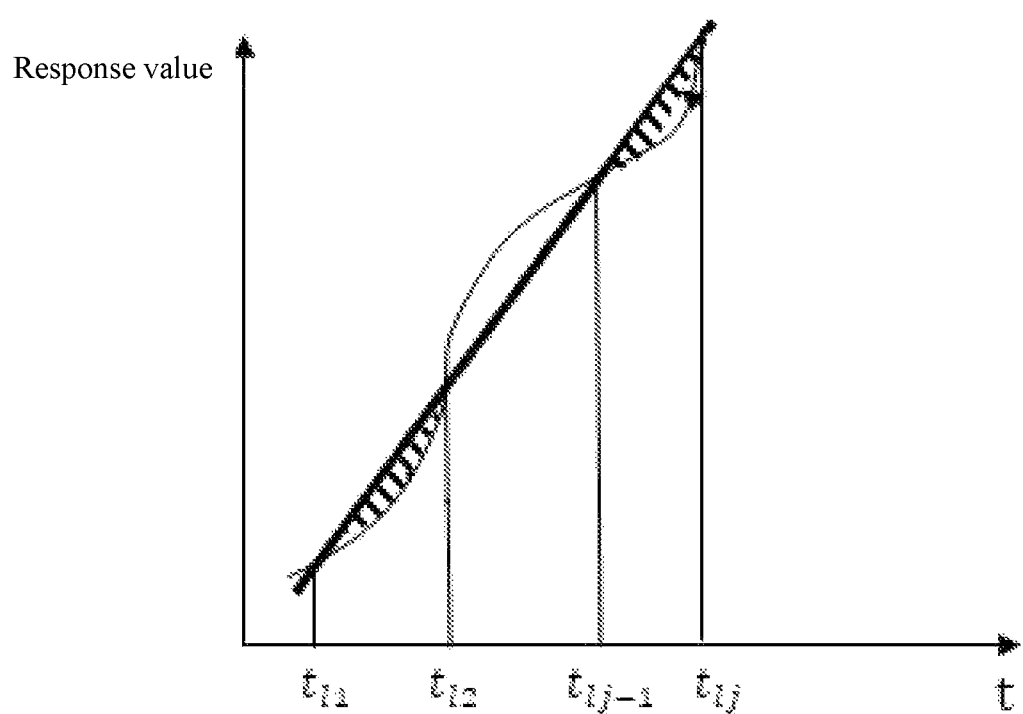
FIG. 14 is a schematic diagram for determining a low performance limit value function according to a low performance limit value index.

FIG. 14 is a schematic diagram for determining a low performance limit value function according to a low performance limit value index.

Figure 15:
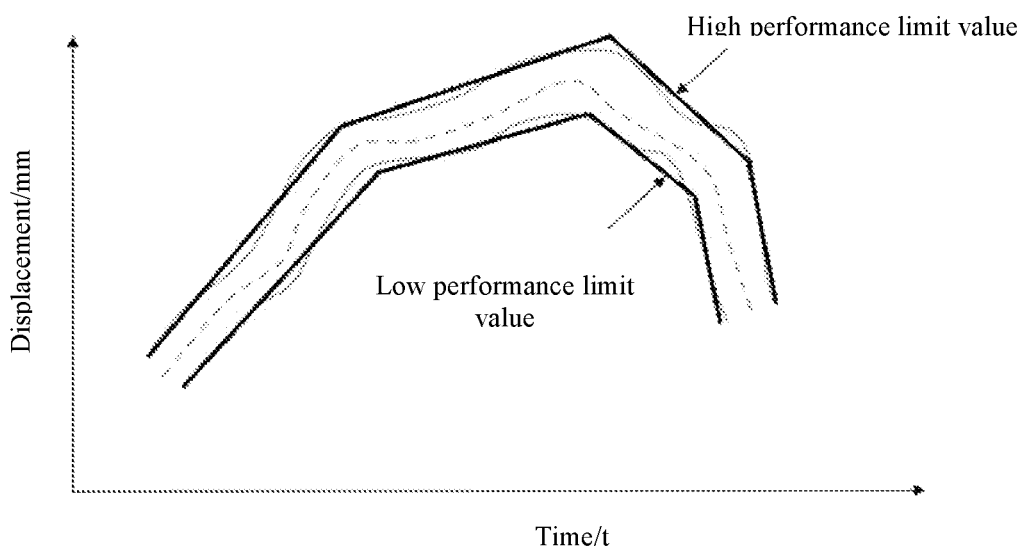
FIG. 15 is a schematic diagram of an impact response performance limit value function of a crash dummy obtained through the method of Embodiment 3.

FIG. 15 is a schematic diagram of an impact response performance limit value function of a crash dummy obtained through the method according to the embodiment.

The impact response performance limit value function of the crash dummy is obtained on the basis of the mean response function, the positive standard response function and the negative standard response function in the embodiment.

Embodiment 4

Figure 16:
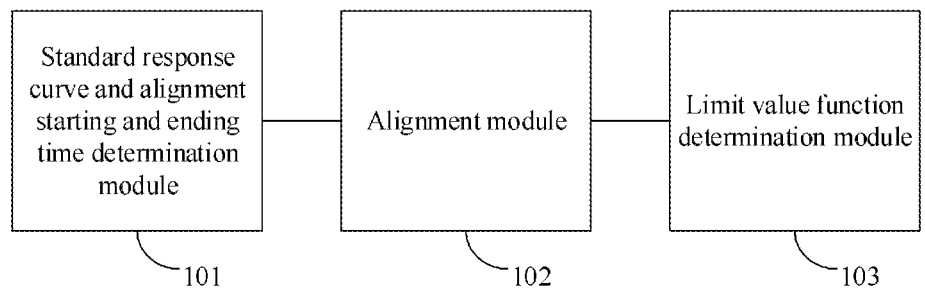
FIG. 16 is a schematic structural diagram of a construction apparatus for an impact response performance limit value of a crash dummy according to Embodiment 4.

As shown in FIG. 16, the embodiment provides a construction apparatus for an impact response performance limit value of a crash dummy. The apparatus includes:

a standard response curve and alignment starting time and ending time determination module 101 configured to determine, according to response curves of the crash dummy under different impact test conditions, a standard response curve and alignment starting time and ending time of each response curve;

an alignment module 102 configured to align, according to differences between other response curves except the standard response curve and the standard response curve, other response curves except the standard response curve with the standard response curve; and a limit value function determination module 103 configured to determine, according to all the aligned response curves, an impact response performance limit value function of the crash dummy.

Furthermore, the limit value function determination module includes: a mean response function determination unit configured to determine a mean response function according to all the aligned response curves; and a limit value function determination unit configured to determine the impact response performance limit value function of the crash dummy according to the mean response function, or configured to determine the impact response performance limit value function of the crash dummy according to the mean response function and all the aligned response curves.

The apparatus is configured to execute the above-mentioned method and thus has at least functional modules and beneficial effects corresponding to the method.

Embodiment 5

Figure 17:
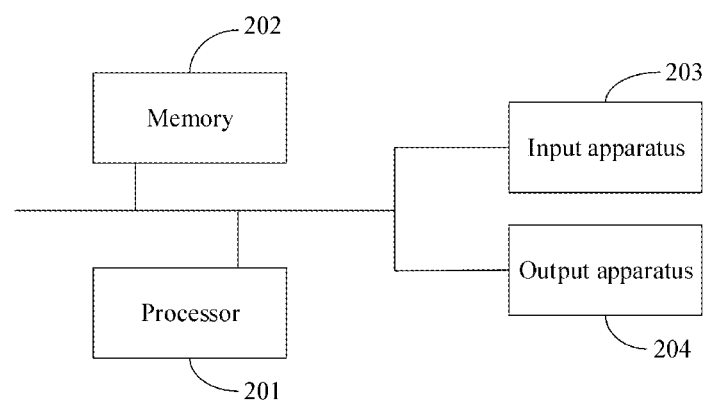
FIG. 17 is a schematic structural diagram of an electronic device provided in Embodiment 5.

As shown in FIG. 17, the embodiment provides an electronic device. The electronic device includes:

at least one processor; and a memory in communication connection with the at least one processor.

The memory stores an instruction executable by the at least one processor, and the instruction is executed by the at least one processor, such that the at least one processor may execute the above-mentioned method. The at least one processor in the electronic device may execute the above-mentioned method, and thus has at least the same advantages as the method.

Optionally, the electronic device further includes interfaces for connecting various parts, including high-speed interfaces and low-speed interfaces. All the parts are interconnected by different buses and may be mounted on a common motherboard or mounted in other ways as required. The processor may process an instruction executed in the electronic device, which includes an instruction stored in or on the memory so as to display graphical information of a graphical user interface (GUI) on an external input/output apparatus (e.g., a display device coupled to the interface). In other embodiments, if necessary, a plurality of processors and a plurality of memories may be used together, and/or a plurality of buses and a plurality of memories may be used together. Likewise, a plurality of electronic devices may be connected (e.g., as a server array, a group of blade servers, or a multiprocessor system), each device providing some necessary operations. In FIG. 17, one processor 201 is used as an example.

The memory 202 serves as a computer-readable storage medium, and may be configured to store software programs, computer executable programs and modules, such as program instructions/modules corresponding to the construction method for an impact response performance limit value of a crash dummy in the embodiments of the present invention (e.g., the standard response curve and alignment starting time and ending time determination module 101, the alignment module 102 and the limit value function determination module 103 in the construction apparatus for an impact response performance limit value of a crash dummy). The processor 201 executes various functional applications and data processing of the device by running the software programs, instructions and modules stored in the memory 202, that is, implements the above-mentioned construction method for an impact response performance limit value of a crash dummy.

The memory 202 may mainly include a program storage area and a data storage area, where the program storage area may store an operating system, and an application program required for at least one function; and the data storage area may store data created according to use of a terminal, etc. In addition, the memory 202 may include a high speed random access memory, and may also include a non-volatile memory, such as at least one of a magnetic disk storage device, a flash memory, or other non-volatile solid-state storage device. In some examples, the memory 202 may further include memories arranged remotely from the processor 201, and the remote memories may be connected to the device through a network. Examples of the network include, but are not limited to, the Internet, an intranet, a local area network, a mobile communications network, or a combination thereof.

The electronic device may further include an input apparatus 203 and an output apparatus 204. The processor 201, the memory 202, the input apparatus 203, and the output apparatus 204 may be connected by a bus or other means. In FIG. 17, bus connection is used as an example.

The input apparatus 203 may receive input numeric or character information, and the output apparatus 204 may include a display device, an auxiliary lighting apparatus (e.g., a light emitting diode (LED)), a haptic feedback apparatus (e.g., a vibration motor), etc. The display device may include, but is not limited to, a liquid crystal display (LCD), an LED display, and a plasma display. In some implementation modes, the display device may be a touch screen.

Embodiment 6

The embodiment provides a computer-readable storage medium storing a computer instruction. The computer instruction is configured to make a computer execute the above-mentioned method. The computer instruction on the computer-readable storage medium is configured to make the computer execute the above-mentioned method and thus has at least the same advantages as the method.

The medium in the present invention may be one of or a combination of computer-readable media. The medium may be a computer-readable signal medium or a computer-readable storage medium. For example, the medium may be, but not limited to, an electrical, magnetic, optical, electromagnetic, infrared, or semiconductor system, apparatus or device, or any combination of the above. More specific examples (a non-exhaustive list) of the medium include: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory, a magnetic memory, or any suitable combination of the above. Herein, the medium may be any tangible medium containing or storing programs that may be used by an instruction execution system, apparatus or device or a combination thereof.

The computer-readable signal medium may include data signals in a baseband or propagated as part of carriers, where computer-readable program codes are carried. The propagated data signals may be in multiple forms, which include, but are not limited to, electromagnetic signals, optical signals or any suitable combination thereof. The computer-readable signal medium may also be any other computer-readable medium other than the computer-readable storage medium. The computer-readable medium is capable of sending, propagating or transmitting a program used by an instruction execution system, apparatus or device or a combination thereof.

The program codes included in the computer-readable medium may be transmitted by any suitable medium, which include, but not limited to, a wireless medium, a wire, an optical cable, radio frequency (RF), etc., or any appropriate combination thereof.

The computer program codes for executing operations in the present invention may be compiled in one or more programming languages or a combination thereof. The programming languages include object-oriented programming languages, such as Java, Smalltalk or C++, and further include conventional procedural programming languages, such as "C" language or similar programming languages. The program codes may be completely or partially executed on a user computer, executed as a separate software package, partially executed on a user computer and partially executed on a remote computer, or completely executed on a remote computer or server. In the case involving a remote computer, the remote computer may be connected to a user computer through any network including a local area network (LAN) or a wide area network (WAN), or may be connected to an external computer (for example, connected through the Internet by using an Internet service provider).

It should be understood that steps may be reordered, added, or deleted by using the various forms of processes described above. For example, the steps described in the present application may be executed in parallel, sequentially or in different orders. As long as the desired results of the technical solutions disclosed in the present application can be achieved, no limitation is imposed herein.

The above-mentioned specific implementation modes do not constitute limitations to the protection scope of the present application. It should be understood by those skilled in the art that various modifications, combinations, sub-combinations and substitutions may be conducted according to design requirements and other factors. Any modifications, equivalent replacements, improvements, etc. made within the spirit and principles of the present application shall fall within the protection scope of the present application.

What is claimed is:

1. A construction method for an impact response performance limit value of a crash dummy, comprising:
   determining, according to response curves of the crash dummy under different impact test conditions, a standard response curve and alignment starting time and ending time of each response curve;
   aligning, according to differences between other response curves except the standard response curve and the standard response curve, other response curves except the standard response curve with the standard response curve; and
   determining, according to all the aligned response curves, an impact response performance limit value function of the crash dummy,
   wherein the differences comprise cumulative differences or cumulative variances;
   the determining, according to response curves of the crash dummy under different impact test conditions, a standard response curve and alignment starting time and ending time of each response curve comprises:
   determining the standard response curve according to the response curves of the crash dummy under different impact test conditions and probabilities of occurrences of different impact test conditions; and
   determining the alignment starting time and ending time of each response curve according to the response curves of the crash dummy under different impact test conditions, a first response ratio function, a second response ratio function, an alignment starting time response ratio and an alignment ending time response ratio,
   wherein the first response ratio function is configured to indicate a relation between a maximum peak response value on the response curve and a response value on the left of the maximum peak response value; and the second response ratio function is configured to indicate a relation between a last peak response value on the response curve and a response value on the right of the last peak response value;
the first response ratio function is $$D_s = \frac{f(t)_{maxpeak} - f(t_i)}{f(t)_{maxpeak}},$$

wherein $f(t)_{maxpeak}$ is the maximum peak response value on the response curve, and $f(t_i)$ is an i-th response value on the left of the maximum peak response value;
the alignment starting time response ratio is 0.7-0.95;
the second response ratio function is $$D_d = \frac{f(t)_{lastpeak} - f(t_j)}{f(t)_{lastpeak}},$$

wherein $f(t)_{lastpeak}$ is the last peak response value on the response curve, and $f(t_j)$ is a j-th response value on the right of the last peak response value;
the alignment ending time response ratio is 0.6-0.92; and
the determining, according to all the aligned response curves, an impact response performance limit value function of the crash dummy comprises:
determining a variance response function according to all the aligned response curves; and determining the impact response performance limit value function of the crash dummy according to the variance response function; alternatively,
determining a mean response function according to all the aligned response curves; and determining the impact response performance limit value function of the crash dummy according to the mean response function; and alternatively,
determining a mean response function according to all the aligned response curves; and determining the impact response performance limit value function of the crash dummy according to the mean response function and all the aligned response curves.

2. The construction method according to claim 1, wherein the aligning, according to differences between other response curves except the standard response curve and the standard response curve, other response curves except the standard response curve with the standard response curve comprises:
computing a cumulative variance of response amplitudes between each of other response curves and the standard response curve; and
translating each of other response curves along a time axis, and for each of other response curves, selecting a curve position having a minimum cumulative variance as an alignment position of other response curves.

3. The construction method according to claim 1, wherein the determining the impact response performance limit value function of the crash dummy according to the mean response function and all the aligned response curves comprises:
determining a positive standard response function and a negative standard response function according to the mean response function and all the aligned response curves; and
determining the impact response performance limit value function of the crash dummy according to the positive standard response function and the negative standard response function.

4. The construction method according to claim 3, wherein the determining the impact response performance limit value function of the crash dummy according to the positive standard response function and the negative standard response function comprises:
determining the number of limit value functions according to the positive standard response function, the negative standard response function, a first interval between alignment starting time and first peak time on the positive standard response function, a second interval between occurrences of adjacent peaks on the positive standard response function, a third interval between last peak time on the positive standard response function and alignment ending time on the positive standard response function, a fourth interval between alignment starting time and first peak time on the negative standard response function, a fifth interval between occurrences of adjacent peaks on the negative standard response function, and a sixth interval between last peak time on the negative standard response function and alignment ending time on the negative standard response function;
constructing, according to the number of limit value functions, a plurality of high performance preselected limit value functions and a plurality of low performance preselected limit value functions; and
determining the impact response performance limit value function of the crash dummy according to the high performance preselected limit value functions, the low performance preselected limit value functions, the positive standard response function and the negative standard response function.

5. The construction method according to claim 4, wherein the determining the number of limit value functions according to the positive standard response function, the negative standard response function, a first interval between alignment starting time and first peak time on the positive standard response function, a second interval between occurrences of adjacent peaks on the positive standard response function, a third interval between last peak time on the positive standard response function and alignment ending time on the positive standard response function, a fourth interval between alignment starting time and first peak time on the negative standard response function, a fifth interval between occurrences of adjacent peaks on the negative standard response function, and a sixth interval between last peak time on the negative standard response function and alignment ending time on the negative standard response function comprises:
for the positive standard response function, comparing a first interval to be compared with a preset interval, and under the condition that the first interval to be compared is greater than or equal to the preset interval, determining that there is a limit value function in the first interval to be compared; and alternatively, under the condition that the first interval to be compared is smaller than the preset interval, determining that there is a limit value function in the next interval adjacent to the first interval to be compared, wherein the first interval to be compared is the first interval, the second interval or the third interval, and the next adjacent interval is greater than or equal to the preset interval; and
for the negative standard response function, comparing a second interval to be compared with a preset interval, and under the condition that the second interval to be compared is greater than or equal to the preset interval, determining that there is a limit value function in the second interval to be compared; and alternatively, under the condition that the second interval to be compared is smaller than the preset interval, determining that there is a limit value function in the next interval adjacent to the second interval to be compared, wherein the second interval to be compared is the fourth interval, the fifth interval or the sixth interval, and the next adjacent interval is greater than or equal to the preset interval.

6. The construction method according to claim 4, wherein the determining the impact response performance limit value function of the crash dummy according to the high performance preselected limit value functions, the low performance preselected limit value functions, the positive standard response function and the negative standard response function comprises:

determining, according to the high performance preselected limit value functions and the positive standard response function, first-type intersection points between the high performance preselected limit value functions and the positive standard response function; determining, according to the first-type intersection points, a first area that is enclosed by the high performance preselected limit value functions and the positive standard response function between two adjacent first-type intersection points and is located above the high performance preselected limit value functions; and determining a high performance limit value function according to the first area; and determining, according to the low performance preselected limit value functions and the negative standard response function, second-type intersection points between the low performance preselected limit value functions and the negative standard response function; determining, according to the second-type intersection points, a second area that is enclosed by the low performance preselected limit value functions and the negative standard response function between two adjacent second-type intersection points and is located below the low performance preselected limit value functions; and determining a low performance limit value function according to the second area.

7. An electronic device, comprising:

at least one processor and a memory in communication connection with the at least one processor, wherein the memory stores an instruction executable by the at least one processor, and the instruction is executed by the at least one processor, such that the at least one processor can execute the method according to claim 1.

* * * * *